United States Patent [19]

Shinohara et al.

[11] Patent Number: 5,146,339
[45] Date of Patent: Sep. 8, 1992

[54] PHOTOELECTRIC CONVERTING APPARATUS EMPLOYING DARLINGTON TRANSISTOR READOUT

[75] Inventors: Mahito Shinohara, Tokyo; Seiji Hashimoto, Yokohama, both of Japan

[73] Assignee: Canon Kabushiki Kaisha, Tokyo, Japan

[21] Appl. No.: 618,361

[22] Filed: Nov. 21, 1990

[30] Foreign Application Priority Data

Nov. 21, 1989 [JP] Japan .................................. 1-300717
Nov. 13, 1990 [JP] Japan .................................. 2-303957

[51] Int. Cl.⁵ ..................... H04N 3/12; H04N 3/14; H04N 5/335
[52] U.S. Cl. ........................ 358/212; 358/213.15; 358/213.16
[58] Field of Search ................... 358/213.15, 213.16, 358/167, 212; 250/208.1

[56] References Cited

U.S. PATENT DOCUMENTS

| | | | |
|---|---|---|---|
| 4,380,755 | 4/1983 | Endlicher et al. | 358/213.15 |
| 4,466,018 | 8/1984 | Soneda et al. | 358/213.15 |
| 4,603,354 | 7/1986 | Hashimoto et al. | |
| 4,731,665 | 3/1988 | Hashimoto et al. | |
| 4,816,910 | 3/1989 | Hashimoto et al. | |
| 4,831,454 | 5/1989 | Tanaka et al. | |
| 4,839,729 | 6/1989 | Ando et al. | 358/213.15 |
| 4,876,601 | 10/1989 | Hashimoto et al. | |
| 4,910,597 | 5/1990 | Harada et al. | |
| 4,910,599 | 5/1990 | Hashimoto . | |
| 4,914,519 | 4/1990 | Hashimoto et al. | 358/213.15 |
| 4,959,723 | 9/1990 | Hashimoto . | |
| 4,967,067 | 10/1990 | Hashimoto et al. | |
| 4,992,876 | 2/1991 | Nishizawa et al. | 358/213.15 |

*Primary Examiner*—Michael Razavi
*Assistant Examiner*—Wendy R. Greening
*Attorney, Agent, or Firm*—Fitzpatrick, Cella, Harper & Scinto

[57] ABSTRACT

There is provided a photoelectric converting apparatus which is constructed in a manner such that a control electrode of a Darlington type transistor is electrically connected to a signal output side of photoelectric conversion elements which can accumulate photoelectrically converted charges, load means is electrically connected to one main electrode of the Darlington type transistor, an emitter-follower circuit is constructed, and a signal is read out from the main electrode and that the photoelectric converting element is constructed so as to accumulate the photoelectrically converted charges into a control electrode region of a semiconductor transistor and to take out an amplified signal from one main electrode region of the semiconductor transistor. In one arrangement, an offset signal is generated and subtracted from the accumulated charge signal to eliminate noise.

16 Claims, 10 Drawing Sheets

PHOTOELECTRIC CONVERTING APPARATUS EMPLOYING DARLINGTON TRANSISTOR READOUT

BACKGROUND OF THE INVENTION

1. Field of the Invention

The present invention relates to a photoelectric converting apparatus and, more particularly, to a photoelectric converting apparatus for reading out signals from photoelectric conversion elements which can accumulate charges which were photoelectrically converted.

2. Related Background Art

Hitherto, there has been known a photoelectric converting apparatus which photoelectrically converts the incident light and accumulates as signal charges and takes out a signal corresponding to the signal charges. As one of the photoelectric converting apparatuses of such a type, there is a photoelectric converting apparatus in which charges are accumulated into a base region of a bipolar transistor and the accumulated charges are amplified and taken out from an emitter.

FIG. 1 is a circuit constructional diagram of such a conventional photoelectric converting apparatus. Sensor circuits of four rows and four columns are shown here as an example.

FIG. 2 is a timing chart for explaining the operation of the above photoelectric converting apparatus.

In FIG. 1, reference numeral 1 denotes a sensor pixel comprising a bipolar transistor Tr, a capacitor C connected to a base of the transistor Tr, and a P type MOS transistor M. Reference numeral 2 denotes an output line which is connected to an emitter of the bipolar transistor Tr of the pixel; 3 indicates an accumulation capacitor to accumulate an output signal; 4 an MOS transistor for switching between the output line 2 and the capacitor 3; 5 an MOS transistor to reset the output line 2; 6 a horizontal output line to output an output signal; 7 an MOS transistor to transfer an accumulation signal of the accumulation capacitor 3 to the horizontal output line 6 from a horizontal shift register HSR in accordance with an output; 8 an MOS transistor to reset the horizontal output line 6; 9 a horizontal drive line to drive the pixels; and 10 an MOS transistor to select the row of the pixels which are driven in accordance with an output from a vertical shift register VSR. $V_1$, $V_2$, $V_3$, and $V_4$ denote outputs from the vertical shift register VSR; PHS a start pulse of the horizontal shift register HSR; and $PH_1$ and $PH_2$ scan pulses of the horizontal shift register HSR. Outputs $H_1$ and $H_3$ from the upper horizontal shift register HSR are synchronized with the scan pulse $PH_1$. Outputs $H_2$ and $H_4$ from the lower horizontal shift register HSR are synchronized with the scan pulse $PH_2$. On the other hand, PT denotes a pulse which is applied to a gate of the MOS transistor 4; PVC a pulse which is applied to a gate of the MOS transistor 5; and PR a drive pulse.

The sensor operation will now be described hereinbelow with reference to FIG. 2.

First, when the output $V_1$ is set to the high level and the first row of the sensor pixels is selected, the pulse PT is set to the high level and the pulse PVC is set to the low level, thereby setting the output line 2 and the accumulation capacitor 3 into the floating state. The drive pulse PR is set to the high level, thereby reading out the pixels of the first row. The signals of the pixels existing on odd-number designated columns are accumulated into the upper accumulation capacitor 3 and the signals of the pixels existing on even-number designated columns are accumulated into the lower accumulation capacitor 3. The signal is transferred to the upper horizontal output line 6 synchronously with the scan pulse $PH_1$. The upper horizontal output line 6 is reset synchronously with the scan pulse $PH_2$. The signal is transferred to the lower horizontal output line 6 synchronously with the scan pulse $PH_2$. The lower horizontal output line 6 is reset synchronously with the scan pulse $PH_1$. For the horizontal scan period, the drive pulse PR is set to the low level and the base of the bipolar transistor Tr of each pixel of the first row is set to the earth potential GND. After completion of the horizontal scan, the drive pulse PR is set to the high level, the base potential is set to the positive potential through a capacitive coupling, a forward current flows to the output line 2 fixed to the GND through the MOS transistor 5, so that the base potential decreases to a predetermined level. When the drive pulse PR is set to the middle level, the potential between the emitter and the base of the bipolar transistor Tr of the pixel is reversely biased, so that the accumulation of the photo charges is started. When the output $V_1$ is set to the low level and the output $V_2$ is set to the high level and the second row is selected, the similar operation is repeated in the pixels of the second row. Thus, the amplitude signal outputs from the pixels are sequentially output from the upper and lower amplifiers.

However, in the above conventional photoelectric converting apparatus, the output signals which were transferred to the horizontal output line 6 by the capacitive division between the accumulation capacitors 3 and the horizontal output lines 6 must be certainly reset. The resetting operations of the horizontal output lines 6 become an obstacle when realizing a high processing speed. On the other hand, as described in FIGS. 1 and 2, to sequentially take out the signals of the pixels of one row, the horizontal output lines must be divided into the upper and lower sides and the signals must be output. Particularly, in the case where the signals of two rows must be transferred so as to be simultaneously read out as in the case of a color sensor, the signal transferring method by the above conventional photoelectric converting apparatus is difficult. Further, since the signal transfer to the horizontal output lines 6 is executed by the capacitive division, there is a problem such that the signal voltage appearing on the horizontal output line 6 is lower than the signal voltage accumulated in the accumulation capacitor 3.

On the other hand, power sources $V_{DD}$ and $V_{SS}$ are always supplied to output amplifiers AMP and electric powers is consumed, so that it is difficult to realize low electric power consumption.

In addition, in the case where a camera of the multi-plate type is constructed by using, for instance, a plurality of photoelectric converting apparatuses of FIG. 1 or in a multi-chip sensor apparatus in which the construction of FIG. 1 is applied to a linear sensor and a plurality of such linear sensors (sensor train) are connected, a variation of offsets of output amplifiers of the chips appears as a level difference of the images and becomes a cause of the deterioration of the picture quality.

On the other hand, pattern wirings to extract clock pulses for driving the chip and output signals are formed on an attached substrate of the multi-chip sensor. There are parasitic capacitances among the wiring patterns, so that the clock pulses to drive the chips are multiplexed to the output signals and become noise. Particularly, in the photoelectric converting apparatus for reading out an original of the A4 size, B4 size, or the like, the parasitic capacitances are very large and the noises is also large. In addition, such noise further increases when the apparatus is driven at a high speed.

In such a sensor, it is difficult to realize high operating speed because of the noise which is by to the parasitic capacitances among the wiring patterns.

SUMMARY OF THE INVENTION

It is an object of the present invention to solve the drawbacks of the conventional techniques as mentioned above.

To accomplish the above object, according to a photoelectric converting apparatus of an embodiment of the invention, a control electrode of a Darlington type transistor is electrically connected to the signal output side of photoelectric conversion elements which can accumulate the photoelectrically converted charges, load means is electrically connected to one main electrode of the Darlington type transistor, an emitter-follower circuit is constructed, and a signal is read out from the main electrode.

The control electrode of the Darlington type transistor is electrically connected to the signal output side of the photoelectric conversion elements, the load means is electrically connected to one main electrode of the Darlington type transistor, and an emitter-follower circuit is constructed. Due to this, there is no need to reset a signal output line connected to the main electrode and the signals can be sequentially output from a plurality of photoelectric conversion elements through one signal output line without executing the resetting operation.

Another object of the invention is to provide a photoelectric converting apparatus which can solve the problems of the conventional techniques as mentioned above and can drive at a high speed and has low electric power consumption.

To accomplish the above object, a photoelectric converting apparatus according to another embodiment of the invention comprises: a first amplifier for outputting photoelectric conversion signals from pixels of photoelectric conversion elements; a second amplifier for outputting offset signals from the pixels of the photoelectric conversion elements; and means for executing a subtraction between output signals of the first and second amplifiers, wherein the first and second amplifiers have control means for controlling the operations of the amplifiers.

On the other hand, according to still another embodiment of the invention, there is provided a photoelectric converting apparatus having a multi-chip sensor constructed by connecting a plurality of photoelectric conversion elements, wherein an output terminal of a first amplifier and an output terminal of a second amplifier of each of the photoelectric conversion elements are commonly connected and subtraction is executed between output signals of the first and second amplifiers of each element.

According to a photoelectric converting apparatus of the embodiment of the invention which was constructed as mentioned above, a plurality of output amplifiers whose amplifying operations can be controlled are provided in an output section of photoelectric conversion elements, noise caused by offsets between the sensor and the output amplifiers and by parasitic capacitances among wiring patterns is eliminated by subtraction between outputs of the amplifiers, and in the case where the sensor is not driven, the output amplifiers are made inoperative, thereby reducing electric power consumption.

In the above photoelectric converting apparatus, control electrodes of Darlington type transistors of a plurality of emitter-follower circuits each of which is constructed by electrically connecting load means to one main electrode of the Darlington type transistor are electrically connected to the signal output side of the photoelectric conversion elements. A photoelectric conversion signal is output from one side of the plurality of emitter-follower circuits and input to the first amplifier, while an offset signal is output from the other side and input to the second amplifier, so that in addition to the above operation, the resetting operation of the signal output line becomes unnecessary.

The above and other objects and features of the present invention will become apparent from the following detailed description and the appended claims with reference to the accompanying drawings.

DETAILED DESCRIPTION OF THE PREFERRED EMBODIMENTS

An embodiment of the invention will be described in detail hereinbelow with reference to the drawings.

Figure 3:
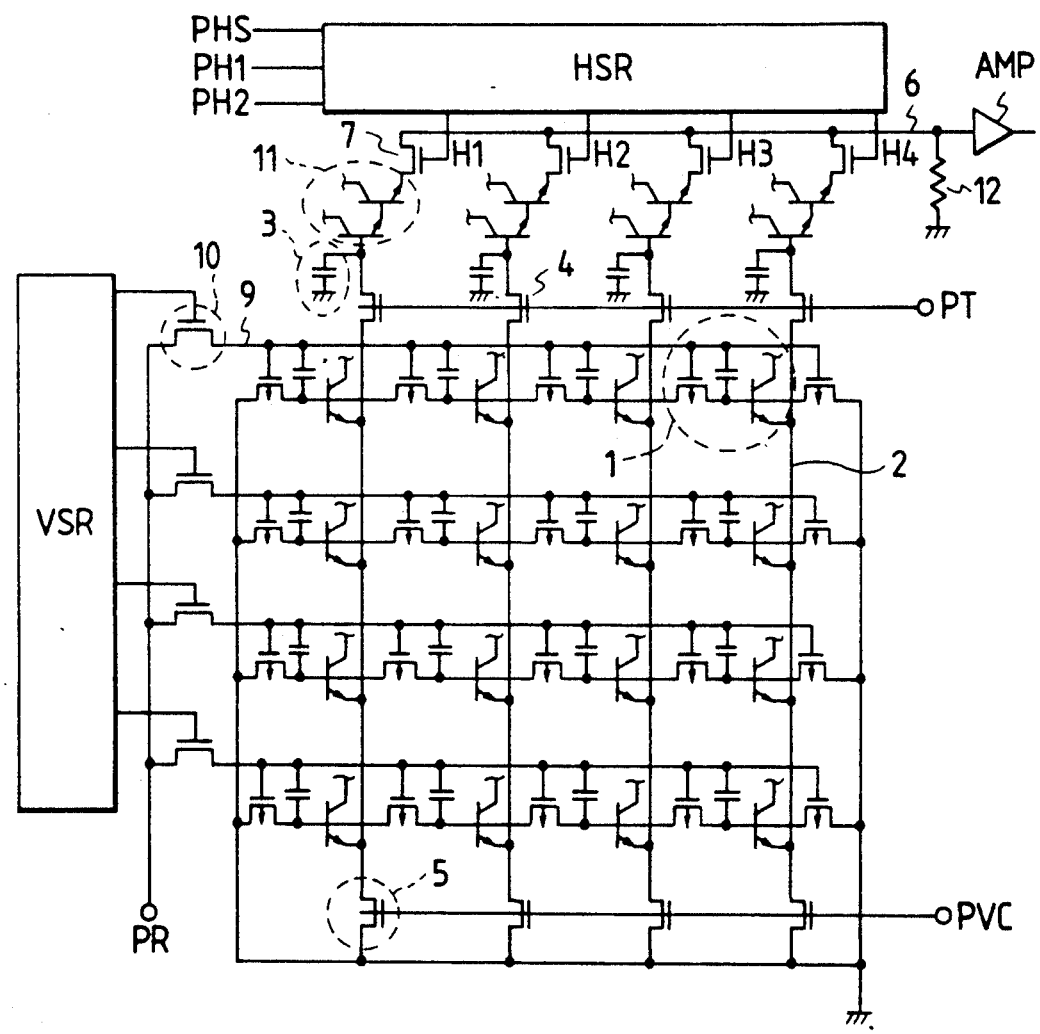
FIG. 3 is a circuit constructional diagram of the first embodiment of a photoelectric converting apparatus of the invention.

FIG. 3 is a circuit constructional diagram of the first embodiment of a photoelectric converting apparatus of the invention.

Figure 1:
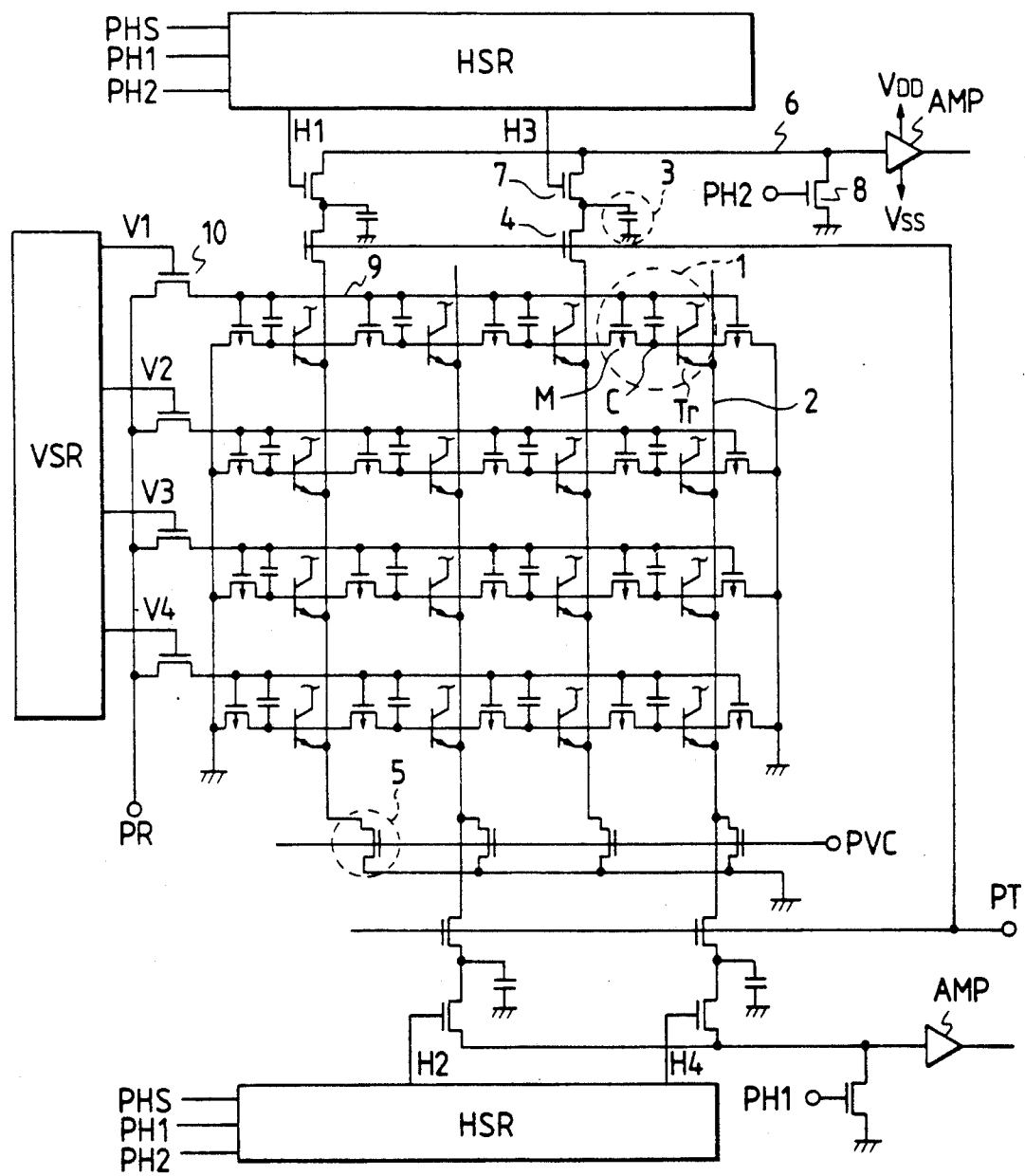
FIG. 1 is a constructional diagram of a conventional photoelectric converting apparatus.

The same or similar parts and components as those shown in FIG. 1 are designated by the same reference numerals and their descriptions are omitted here.

In FIG. 3, reference numeral 11 denotes a Darlington type bipolar transistor. A base region is connected to the accumulation capacitor 3. Reference numeral 12 denotes a load resistor. When the MOS transistor 7 is turned on, an emitter-follower circuit is formed by the load resistor 12 together with the Darlington type bipolar transistor 11.

Figure 2:
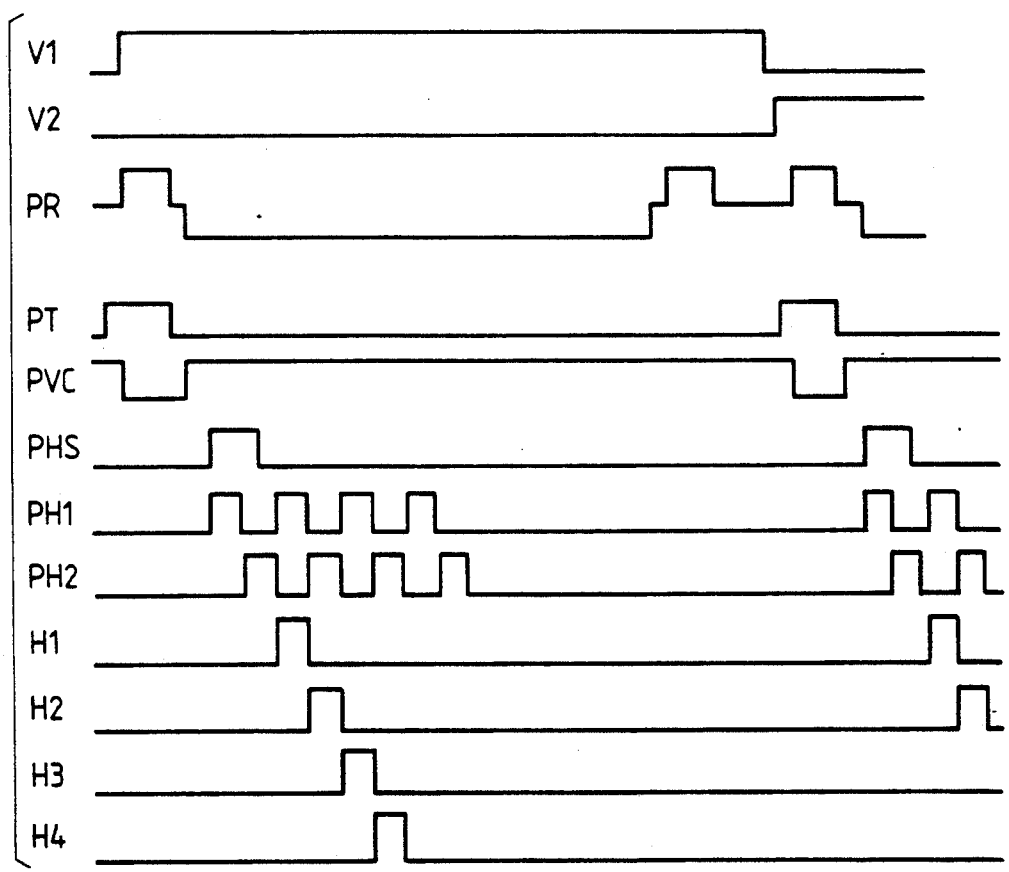
FIG. 2 is a chart for explaining the operation of the above photoelectric converting apparatus.

The operation of the sensor pixel is substantially the same as that in the conventional apparatus described in conjunction with FIGS. 1 and 2 except that after the signal was accumulated in the accumulation capacitor 3, the signal is output to the horizontal output line 6 by the emitter-follower operation through the MOS transistor 7 which was turned on by an output from the horizontal shift register HSR. Although the base is in the floating state at the time of the emitter-follower operation, since a current amplification factor of the Darlington type bipolar transistor 11 is extremely high, a drop of the base potential can be substantially ignored. In such a signal read-out operation, the resetting of the horizontal output line 6 as in the conventional apparatus is unnecessary. The signals of the pixels of one row can be output from one horizontal output line by using the shift register which outputs synchronous outputs of both of the scan pulses $PH_1$ and $PH_2$. On the other hand, although the output level decreases to a value lower than the signal level accumulated in the accumulation capacitors 3 due to the resistive division of the ON resistance of the MOS transistor 7 and the load resistor 12, the ON resistance of the MOS transistor 7 can be easily reduced. Therefore, the signal of a level which is significantly higher than that in the case using the conventional method by the capacitive division can be output to the horizontal output line 6.

Figure 4:
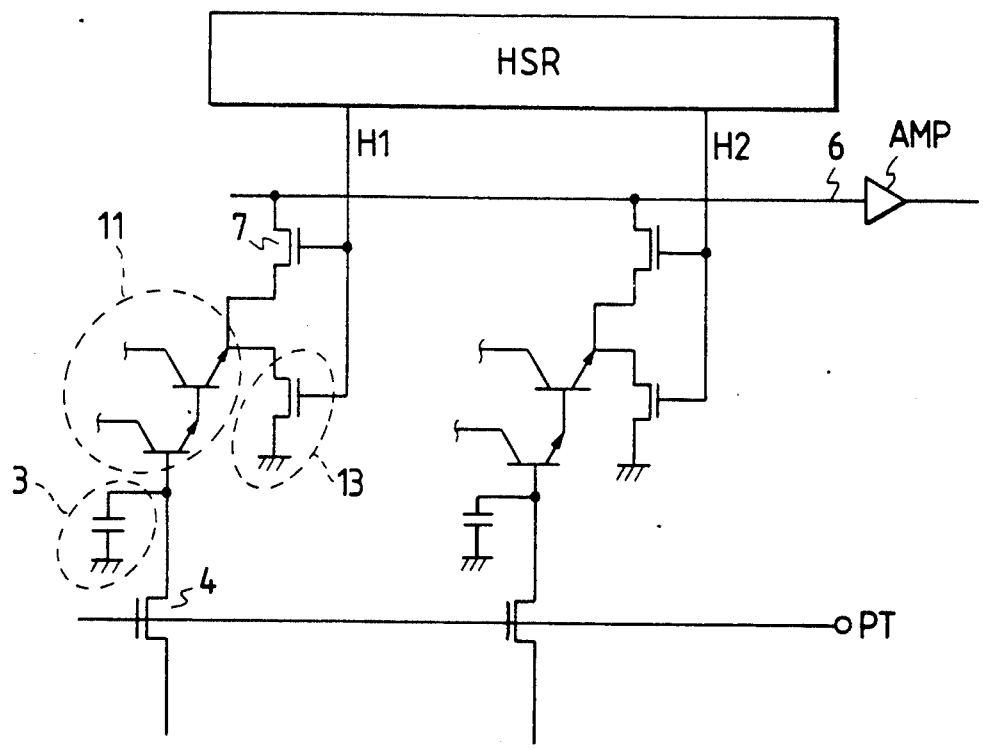
FIG. 4 is a circuit constructional diagram of a horizontal transfer section of a signal in the second embodiment of the photoelectric converting apparatus of the invention.

FIG. 4 is a circuit constructional diagram of a horizontal transfer section of the signal in the second embodiment of the photoelectric converting apparatus of the invention.

In the diagram, reference numeral 13 denotes an MOS transistor which functions as a load resistor of the emitter-follower circuit when it is turned on. The MOS transistor 13 is connected to each of the Darlington type bipolar transistors 11. Although the operation of the horizontal transfer section is the same as that in the case of FIG. 3, in the case of the output in the embodiment, since the resistive division is not performed, the signal in the accumulation capacitor 3 appears in the horizontal output line 6 without reducing the signal level.

In the first embodiment shown in FIG. 3, there is a variation in output of the horizontal output line 6 due to a variation in ON resistance of the MOS transistor 7. However, according to the second embodiment, an influence on a variation in output of the emitter-follower circuit by a variation in ON resistance of the MOS transistor 13 is small.

Figure 5:
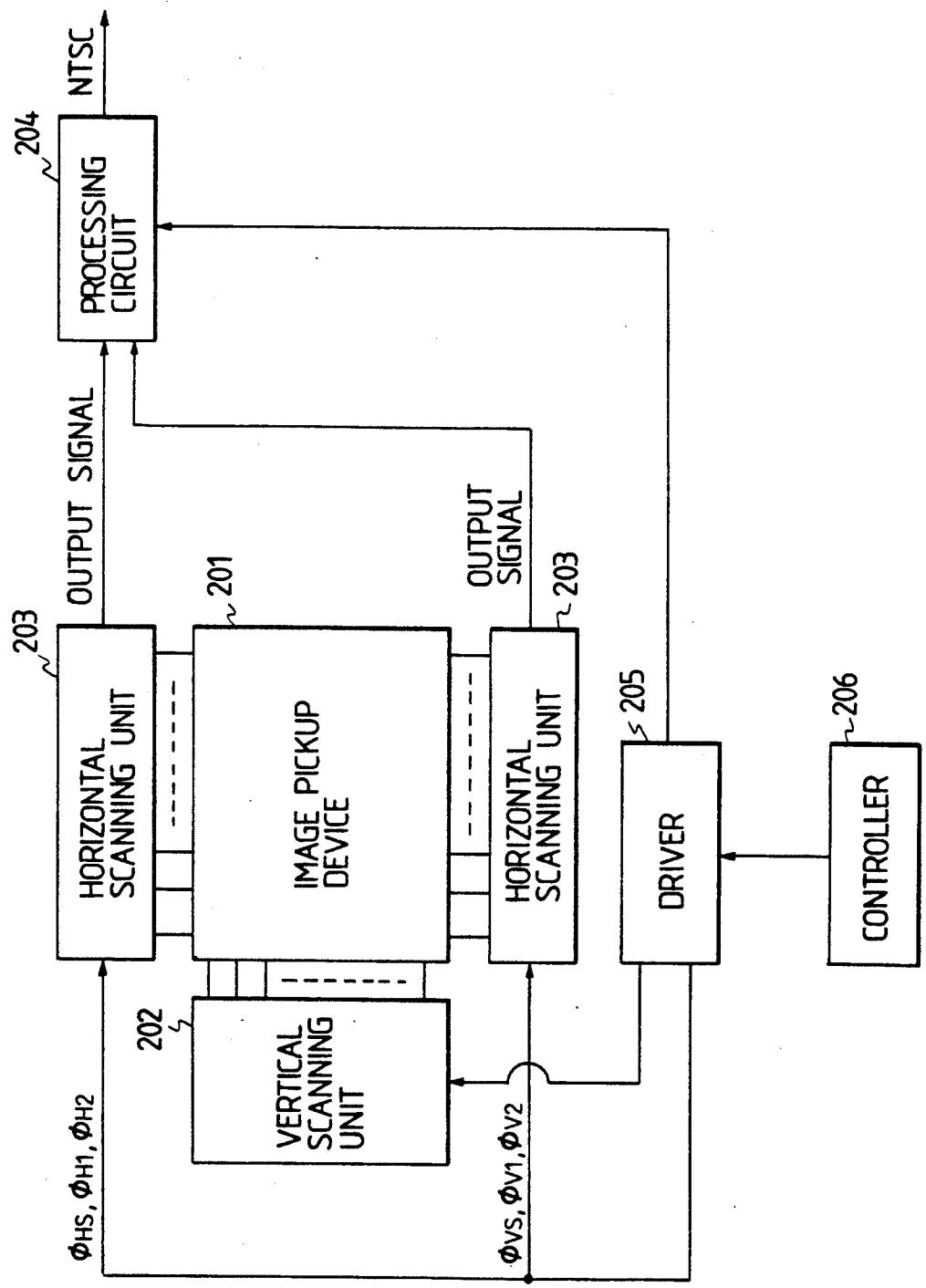
FIG. 5 is a schematic constructional diagram of a solid-state image pickup apparatus to which the invention is applied.

FIG. 5 is a schematic constructional diagram of a solid-state image pickup apparatus to which the invention is applied.

In the diagram, an image pickup device 201 is constructed by arranging photosensors like an area. The image pickup device 201 is a television scanned by a vertical scanning unit 202 and a horizontal scanning unit 203.

A signal outputted from the horizontal scanning unit 203 passes through a processing circuit 204 and is output as a standard television signal.

Drive pulses $\phi_{HS}$, $\phi_{H1}$, $\phi_{H2}$, $\phi_{VS}$, $\phi_{V1}$, $\phi_{V2}$, etc. of the vertical scanning unit 202 and the horizontal scanning unit 203 are supplied from a driver 205. The driver 205 is controlled by a controller 206.

As described above, according to the photoelectric converting apparatuses of the first and second embodiments of the invention, the control electrode of the Darlington type transistor is electrically connected to the signal output side of the photoelectric conversion elements, the load means is electrically connected to one main electrode of the Darlington type transistor, and an emitter-follower circuit is constructed. Therefore, the resetting of the signal output line which is connected to the main electrode becomes unnecessary. The signals can be sequentially output from a plurality of photoelectric conversion elements through one signal output line without executing the resetting operation. On the other hand, the capacitive division of the signal as in the conventional apparatus is not performed. Therefore, the signals accumulated in the bases can be directly output to the signal output line.

The third embodiment of the invention will now be described with reference to FIG. 6.

Figure 6:
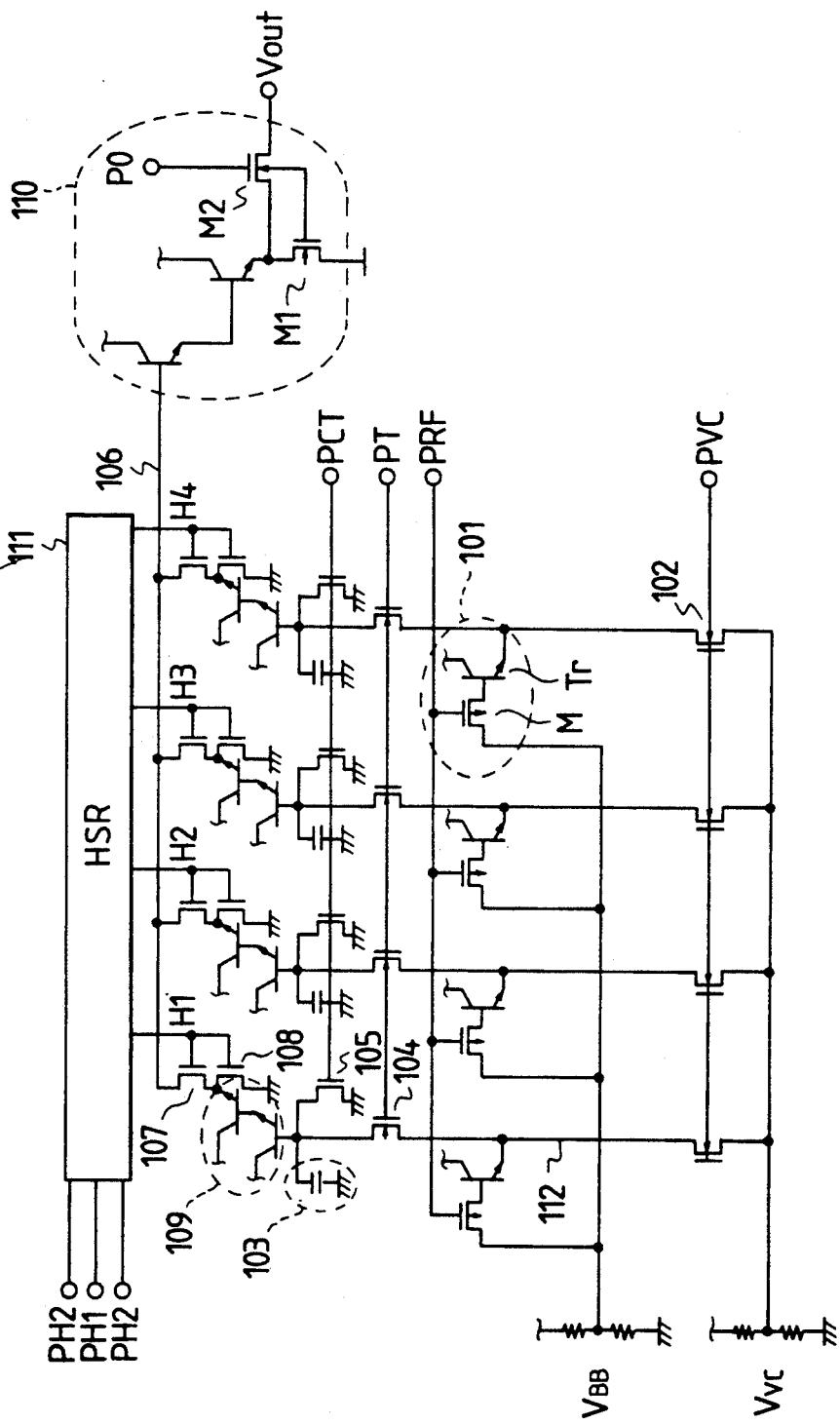
FIG. 6 is a circuit constructional diagram showing a signal reading circuit according to the photoelectric converting apparatus of the invention.

FIG. 6 is a circuit constructional diagram showing a signal reading circuit according to the third embodiment of the photoelectric converting apparatus of the invention.

For simplicity of explanation, the circuit system to output the offset signal from each pixel is omitted. The third embodiment relates to the case where the invention was applied to a line sensor.

In FIG. 6, reference numeral 101 denotes a pixel comprising: a bipolar transistor type sensor Tr; and an MOS transistor M whose base is reset to a potential $V_{BB}$; 102 indicates an MOS transistor to reset a vertical output line 112; 104 an MOS transistor to transfer signal from the pixel 101 into an accumulation capacitor 103; 105 an MOS transistor to reset the accumulation capacitor 103; and 109 a Darlington emitter-follower circuit in which a base of a bipolar transistor at the front stage is connected to the accumulation capacitor 103 and an emitter of a bipolar transistor at the post stage is connected to an MOS transistor 108 which functions as a load resistor when it is turned on. Reference numeral 107 denotes an MOS transistor to transfer a signal from an emitter of the bipolar transistor at the front stage to a horizontal output line 106. Drains of the MOS transistors 107 and 108 are commonly connected. Gates of the MOS transistors 107 and 108 are also similarly commonly connected. Those drains and gates are controlled by pulses ($H_1$, $H_2$, ...) of the scanning circuit.

Reference numeral 110 denotes an output amplifier which is connected to the horizontal output line 106. The output amplifier 110 comprises: a Darlington type bipolar transistor; an MOS transistor $M_1$ which functions as a load resistor when it is turned on; and an MOS transistor $M_2$ which outputs a signal.

PCT denotes a pulse to control the MOS transistor 105; PT the pulse to control the MOS transistor 104; PRF a pulse to control the MOS transistor M of the pixel 101; PVC the pulse to control the MOS transistor 102; PO a pulse to control the MOS transistor $M_2$ of the output amplifier 110; and PHS, $PH_1$, and $PH_2$ the pulses to control the horizontal shift register (HSR) 111.

Since the Darlington emitter-follower circuit 109 has a very large current amplification factor $h_{fe}$, the signal accumulated in the accumulation capacitor 103 is hardly destroyed and the read-out gain is also almost equal to 1. On the other hand, the Darlington emitter-follower circuit 109 operates only when the pulses ($H_1$, $H_2$, ... ) were supplied from the scanning circuit and outputs the signal corresponding to the charges in the accumulation capacitor 103 to the horizontal output line 106.

If the Darlington emitter-follower circuit 109 is used, the signal read-out operation itself to the horizontal output line 106 results in that the preceding signal is reset (if the potential of the horizontal signal line 106 is high due to the residual charges in the horizontal signal line 106, the excessive residual charges are discharged until a predetermined signal potential by the Darlington emitter-follower circuit 109). Thus, the resetting operation after the signal was read out as in the conventional apparatus is unnecessary. Therefore, in the case of reading out the signal from each pixel, there is no need to execute the resetting operation every transfer of the signal from each pixel, so that a high operating speed can be realized.

Two MOS transistors $M_1$ and $M_2$ to control the operations of the amplifiers are connected to the emitter of the Darlington type bipolar transistor of the output amplifier 110. When the signal is being output, the two MOS transistors $M_1$ and $M_2$ are made conductive by the pulse PO. When the photoelectric converting apparatus is in the operation standby mode, the MOS transistors $M_1$ and $M_2$ are made non-conductive. Therefore, electric power consumption during the operation standby mode is suppressed and low electric power consumption can be realized.

A signal reading circuit having a circuit system to read out the offset voltage of the sensor transistor constructing the pixel will now be described.

Figure 7:
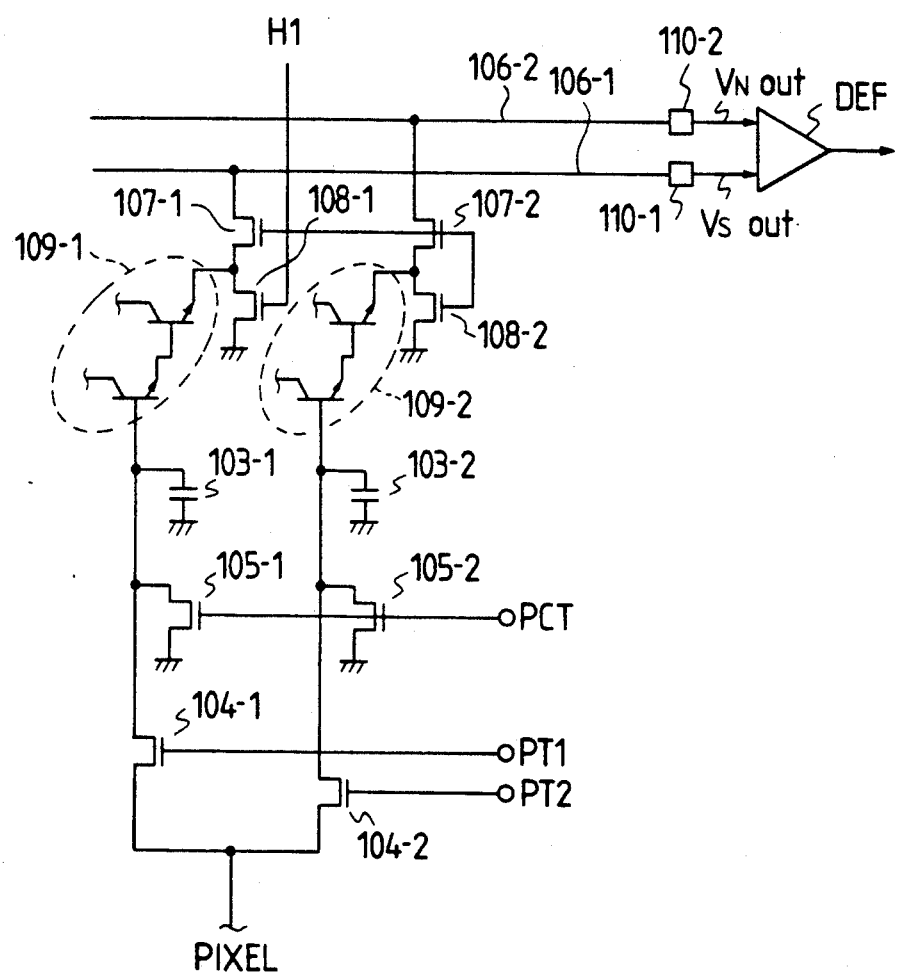
FIG. 7 is a circuit constructional diagram corresponding to one pixel of a signal reading circuit of the third embodiment of tee photoelectric converting apparatus of the invention to read out an offset voltage of a sensor transistor constructing a pixel separately from a photoelectric conversion signal.

FIG. 7 is a circuit constructional diagram corresponding to one pixel of the signal reading circuit having a circuit system to read out the offset voltage of the sensor transistor constructing the pixel.

Since the construction and operation of the amplifier which is connected to the horizontal output line have already been described by using FIG. 6, their descriptions are omitted here.

As shown in FIG. 7, the signal from a predetermined pixel is accumulated into an accumulation capacitor 103-1 through a transistor 104-1 which is controlled by a pulse $PT_1$. On the other hand, an offset signal from the above predetermined pixel is accumulated into an accumulation capacitor 103-2 through a transistor 104-2 which is controlled by a pulse $PT_2$. MOS transistors 107-1, 107-2, 108-1, and 108-2 are turned on by a signal from the horizontal shift register (HSR) 111. A signal (signal amplified by a Darlington emitter-follower circuit 109-1) corresponding to the signal charges from the pixel which were accumulated in the accumulation capacitor 103-1 is output to a horizontal output line 106-1. A signal (offset signal amplified by a Darlington emitter-follower circuit 109-2) corresponding to the offset signal charges from the pixel which were accumulated in the accumulation capacitor 103-2 is output to a horizontal output line 106-2. A photoelectric conversion signal $V_S$ is read out from the horizontal output line 106-1. An offset signal $V_N$ is read out from the horizontal output line 106-2. The signals $V_S$ and $V_N$ are transmitted through output amplifiers 110-1 and 110-2 and, thereafter, a subtraction between the resultant amplified signals is executed by a subtracting circuit DEF at the post stage, so that the offset voltage of each sensor transistor can be eliminated. Therefore, the signal in which an S/N ratio is high and temperature characteristics are guaranteed can be obtained.

Even in the embodiment as well, if the Darlington emitter-follower circuits 109-1 and 109-2 are used, the reading operations themselves of the signals to the horizontal output lines 106-1 and 106-2 result in the preceding signal or the offset signal being reset, so that the resetting operation after completion of the read-out operation as in the conventional apparatus becomes unnecessary. Consequently, in the case of reading out the signal or offset signal from each pixel, there is no need to execute the resetting each time the signal or offset signal from each pixel is transferred. A high operating speed can be realized.

Figure 8:
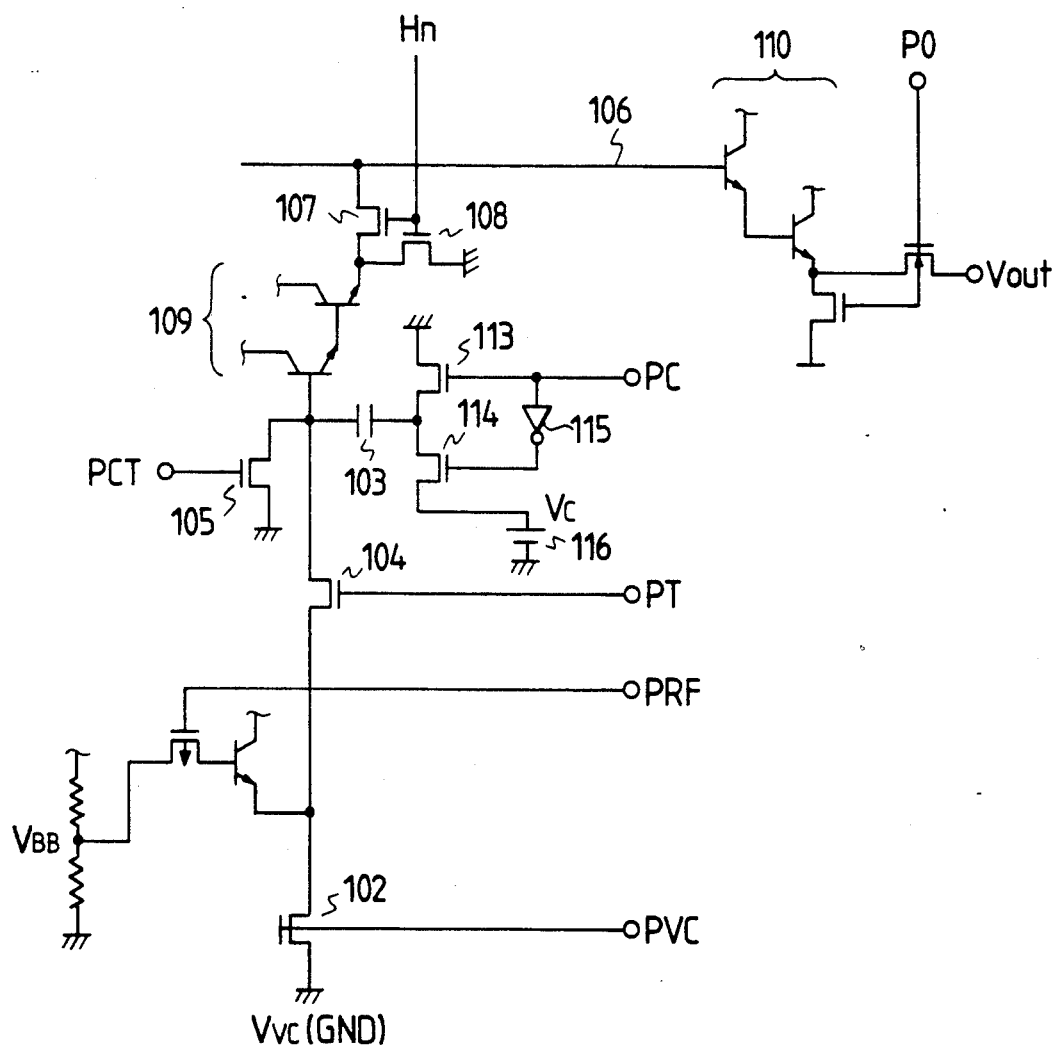
FIG. 8 is a constructional diagram corresponding to one pixel of a signal reading circuit of the fourth embodiment of the invention when a reset potential $V_{VC}$ of the sensor transistor is set to a potential GND.

FIG. 8 is a circuit constructional diagram corresponding to one pixel of the signal reading circuit of the fourth embodiment of the invention in the case where the reset potential $V_{VC}$ of the bipolar transistor type sensor is set to GND.

In the Darlington emitter-follower circuit 109 and the Darlington emitter-follower output amplifier 110 in the fourth embodiment, it is necessary to set the base potential to be higher than the emitter potential by about 1.2 V.

Therefore, at least 1.2 V or higher is needed as a bias potential of the accumulation capacitor 103. For this purpose, in the fourth embodiment, there are provided: an MOS transistor 113 to set the potential of one terminal of the accumulation capacitor 103 to GND; an MOS transistor 114 to set one terminal of the accumulation capacitor 103 to the potential $V_C$ in order to give a bias potential to the capacitor 103; an inverter 115 to turn on either one of the MOS transistors 113 and 114 by the pulse PC; and a voltage source 116 to give the potential $V_C$.

Figure 9:
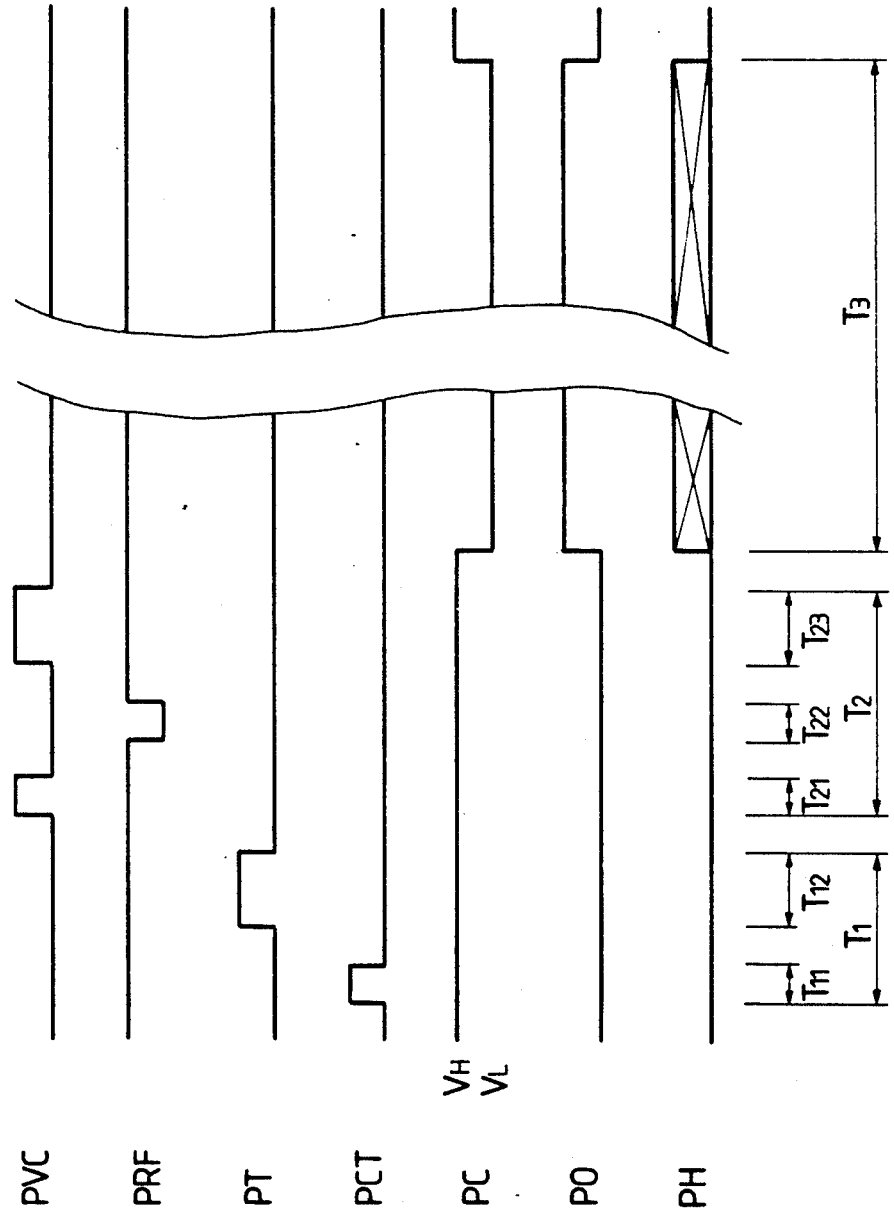
FIG. 9 is a timing chart of the signal reading circuit.

FIG. 9 shows a timing chart of the signal reading circuit of the embodiment.

In the diagram, $T_1$ denotes a transfer period of a photoelectric conversion signal of the sensor transistor, $T_2$ indicates a reset period of the sensor transistor, and $T_3$ an output period of the signal.

In the period $T_1$, $T_{11}$ denotes an elimination period of the residual signal in the accumulation capacitor 103. By setting the pulse PCT to the high level and turning on the MOS transistor 105, the residual signals in the vertical output line and the accumulation capacitor 103 are reset. $T_{12}$ indicates a transfer period of the photoelectric conversion signal into the accumulation capacitor 103. By setting the pulse PT to the high level and turning on the MOS transistor 104, the photoelectric conversion signal is transferred to the capacitor 103.

In the period, $T_2$, $T_{21}$ denotes an elimination period of the residual signal in the emitter of the sensor transistor. By setting the pulse PVC to the high level and turning on the MOS transistor 102, the residual signal in the emitter of the sensor transistor is eliminated. $T_{22}$ indicates a reset period of the base of the sensor transistor. By setting the pulse PRF to the low level and turning on the PMOS transistor of the pixel, the base of the sensor transistor is reset. $T_{23}$ indicates a transient refresh period of the sensor transistor. By setting the pulse $PV_C$ to the high level and turning on the MOS transistor 102, the charges remaining in the base of the sensor transistor are eliminated.

In the period $T_3$, when the pulse PC changes from $V_H$ to $V_L$, the MOS transistor 114 is turned on, a bias potential is applied to one terminal of the accumulation capacitor 103, and the potential of the other terminal of the capacitor 103 rises by only the bias potential. In this state, the scan is performed.

Figure 10:
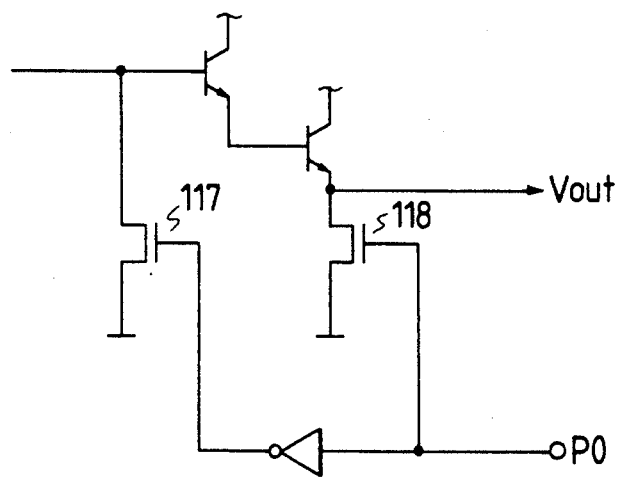
FIG. 10 shows another construction example of an output amplifier.

FIG. 10 shows another construction example of the output amplifier.

As shown in FIG. 10, MOS transistors 117 and 118 are respectively connected to the base and emitter of the Darlington type bipolar transistor. Either one of the MOS transistors 117 and 118 is turned on by the pulse PO.

In the output amplifier of this example, since an output signal $V_{OUT}$ is directly output from an emitter terminal, it becomes a low impedance signal. Therefore, the output amplifier is hardly influenced by the noises and can operate at a high speed.

Figure 11:
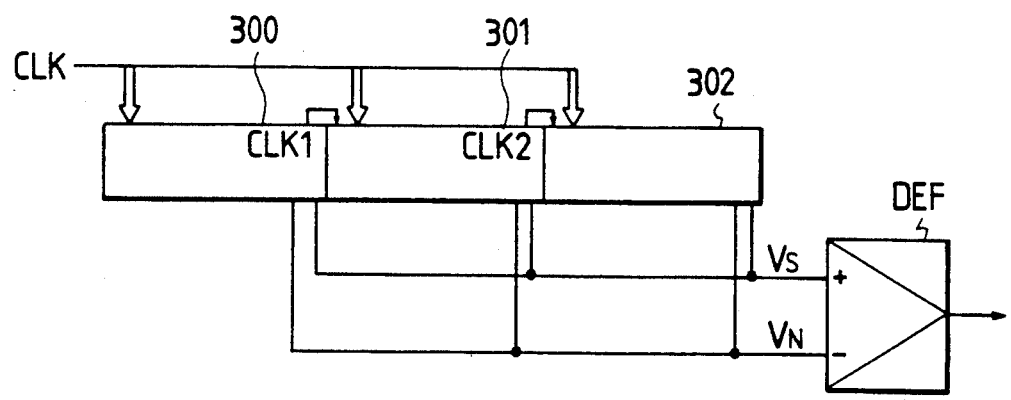
FIG. 11 is a schematic explanatory diagram of a multi-chip sensor apparatus to which the invention is applied.

FIG. 11 is a schematic explanatory diagram of a multi-chip sensor apparatus to which the invention is applied.

As already described in the conventional photoelectric converting apparatus, in the attaching substrate of the multi-chip sensor, there is a problem such that the clock pulses to drive the chips are multiplexed to the output signal due to the parasitic capacitances among the wiring patterns and becomes noise.

In the multi-chip sensor apparatus shown in FIG. 11 to which the invention was applied, output signal terminals $V_S$ of chips 300 to 302 are commonly connected. Output offset terminals $V_N$ of the chips 300 to 302 are also commonly connected. A subtraction between outputs of the terminal $V_S$ and $V_N$ is executed by a differential amplifier DEF, so that the parasitic capacitances among the wiring patterns can be eliminated by the subtracting process. On the other hand, the output amplifiers 110 in the chips other than the chip whose readout operation is being executed are in the inoperative state.

As described in detail above, according to the photoelectric converting apparatuses of the third and fourth embodiments of the invention, a plurality of output amplifiers whose amplifying operations can be controlled have been provided in the output section of the photoelectric conversion elements and the noise caused by the offsets between the sensor and the output amplifiers and the parasitic capacitances among the wiring patterns has been eliminated by the subtracting process between the outputs of the output amplifiers, so that the photoelectric converting apparatus can be driven at a high speed. On the other hand, in the case where the sensor is not driven, the electric power consumption can be reduced by making the output amplifiers inoperative.

We claim:

1. A photoelectric converting apparatus, wherein a control electrode of a Darlington type transistor is connected to a signal output side of photoelectric conversion elements which can accumulate charges that are photo-electrically converted and a load means is electrically connected to one main electrode of said Darlington type transistor so that said Darlington type transistor operates as an emitter-follower circuit and a signal is read out from said main electrode.

2. An apparatus according to claim 1, wherein the photoelectric conversion element comprises a semiconductor transistor in which the photoelectrically converted charges are accumulated in a control electrode region of said semiconductor transistor, and an amplified signal is taken out from one of main electrode regions of the semiconductor transistor.

3. An apparatus according to claim 1, wherein a plurality of said photoelectric conversion elements are arranged.

4. An apparatus according to claim 3, wherein the Darlington type transistor is provided for each of the photoelectric conversion elements.

5. An apparatus according to claim 2, wherein a plurality of said photoelectric conversion elements are arranged.

6. An apparatus according to claim 5, further comprising a plurality of first switching means each of which is arranged between the photoelectric conversion elements and is selectively turned on or off.

7. An apparatus according to claim 6, wherein the first switching means is arranged between the control electrodes in said plurality of photoelectric conversion elements.

8. An apparatus according to claim 7, wherein a capacitor is provided for the control electrode of the semiconductor transistor.

9. An apparatus according to claim 8, wherein one end of the capacitor and the first switching means are commonly connected.

10. An apparatus according to claim 1, wherein the load means includes second switching means.

11. An apparatus according to claim 3, wherein said plurality of photoelectric conversion elements are arranged like a matrix.

12. An apparatus according to claim 3, wherein the Darlington type transistor is commonly provided for outputs of said plurality of photoelectric conversion elements.

13. A photoelectric converting apparatus comprising:
photoelectric conversion elements comprising pixels for performing a photoelectric conversion operation;
a first amplifier for outputting a photoelectric conversion signal from each of the pixels of the photoelectric conversion elements;
a second amplifier for outputting an offset signal from each of the pixels of the photoelectric conversion elements; and
means for executing a subtracting process between output signals of the first and second amplifiers,
wherein the first and second amplifiers have control means for controlling the operations of the amplifiers to only turn on said amplifiers when there are output signals.

14. An apparatus according to claim 13, wherein the first and second amplifiers include a plurality of emitter-follower circuits each of which is constructed by electrically connecting load means to one main electrode of a Darlington type transistor.

15. An apparatus according to claim 14, wherein the control electrode of the Darlington type transistor is electrically connected to a signal output side of the photoelectric conversion elements.

16. A multi-chip sensor system which is constructed by connecting a plurality of said photoelectric converting apparatuses according to claim 13, wherein output terminals of the second amplifiers of the photoelectric converting apparatuses are commonly connected, output terminals of the second amplifiers of the photoelectric converting apparatuses are also commonly connected, and said system has common subtracting means for executing a subtraction between the signal of the output terminal of the first amplifier and the signal of the output terminal of the second amplifier.

* * * * *

UNITED STATES PATENT AND TRADEMARK OFFICE
CERTIFICATE OF CORRECTION

PATENT NO. : 5,146,339

DATED : September 8, 1992

INVENTOR(S) : MAHITO SHINOHARA, ET AL.

It is certified that error appears in the above-identified patent and that said Letters Patent is hereby corrected as shown below:

COLUMN 2

Line 54, "powers" should read --power--.

COLUMN 3

Line 6, "noises" should read --noise--.
Line 9, "is by to" should read --is caused by--.

COLUMN 4

Line 27, "constructional" should read --circuit constructional--.
Line 29, "chart" should read --timing chart--.
Line 46, "tee" should read --the--.
Line 50, "constructional" should read --circuit constructional--.

COLUMN 5

Line 35, "signifi-" should read --substantially--.
Line 36, "cantly" should be deleted.

COLUMN 6

Line 4, "$\phi V_2$," should read --$\phi_{v2}$,--.

COLUMN 8

Line 66, "$PV_c$" should read --PVC--.

UNITED STATES PATENT AND TRADEMARK OFFICE
CERTIFICATE OF CORRECTION

PATENT NO. : 5,146,339
DATED     : September 8, 1992
INVENTOR(S) : MAHITO SHINOHARA, ET AL.

It is certified that error appears in the above-identified patent and that said Letters Patent is hereby corrected as shown below:

COLUMN 9

Line 16, "noises" should read --noise--.
Line 22, "attaching" should read --attached--.
Line 32, "terminal $V_s$" should read --terminals $V_s$--.

COLUMN 10

Line 34, "pixels" should read --pixels,--.
Line 60, "second amplifiers" should read --first amplifiers--.

Signed and Sealed this

Twenty-third Day of November, 1993

Attest:

BRUCE LEHMAN

*Attesting Officer*            *Commissioner of Patents and Trademarks*